Sept. 26, 1967 KARL-HEINZ GREIFENHAGEN ETAL 3,343,757

TURNTABLE FOR MAGNETIC SOUND- OR VIDEO-TAPE RECORDERS

Filed Sept. 23, 1965

Inventors:

Karl-H. Greifenhagen
Peter Vollmann

United States Patent Office
3,343,757
Patented Sept. 26, 1967

3,343,757

TURNTABLE FOR MAGNETIC SOUND- OR VIDEO-TAPE RECORDERS

Karl-Heinz Greifenhagen and Dieter Sohnlein, Kronach, Upper Franconia, Germany, assignors to Loewe Opta G.m.b.H., Berlin, Germany, a company of Germany Filed Sept. 23, 1965, Ser. No. 489,766
Claims priority, application Germany, Sept. 26, 1964, L 38,035, Patent No. 1,911,749
3 Claims. (Cl. 242—55.12)

The invention relates to turntables for magnetic sound or video recorders (magnetic tape recorders) and aims at simplifying the placing of the tape reel on such turntable.

It is known that the conventional magnetic tape recorders have expanding spindles or turntable spindles with a sprung catch on which the reels are placed. The drive is then ensured by the chucking action or the sprung catches.

To eliminate such expanding spindles or sprung catches or the like on the turntable spindle the invention proposes providing in their place as a means of accommodating the tape reel one or several rings arranged concentrically around the axis of rotation of the reel or several annularly arranged supporting cams distributed concentrically round the axis of rotation of the reel and consisting of some material of good frictional properties, e.g., rubber or a plastics material. These rings or cams further have depressions of the nature of suction cups in the surface contacting the reel, and thus through their suction additionally ensure a good drive on the tape reels when the recorder is running.

In the accompanying drawings there are shown exemplary embodiments of the invention:

Figures 1, 2, 3:
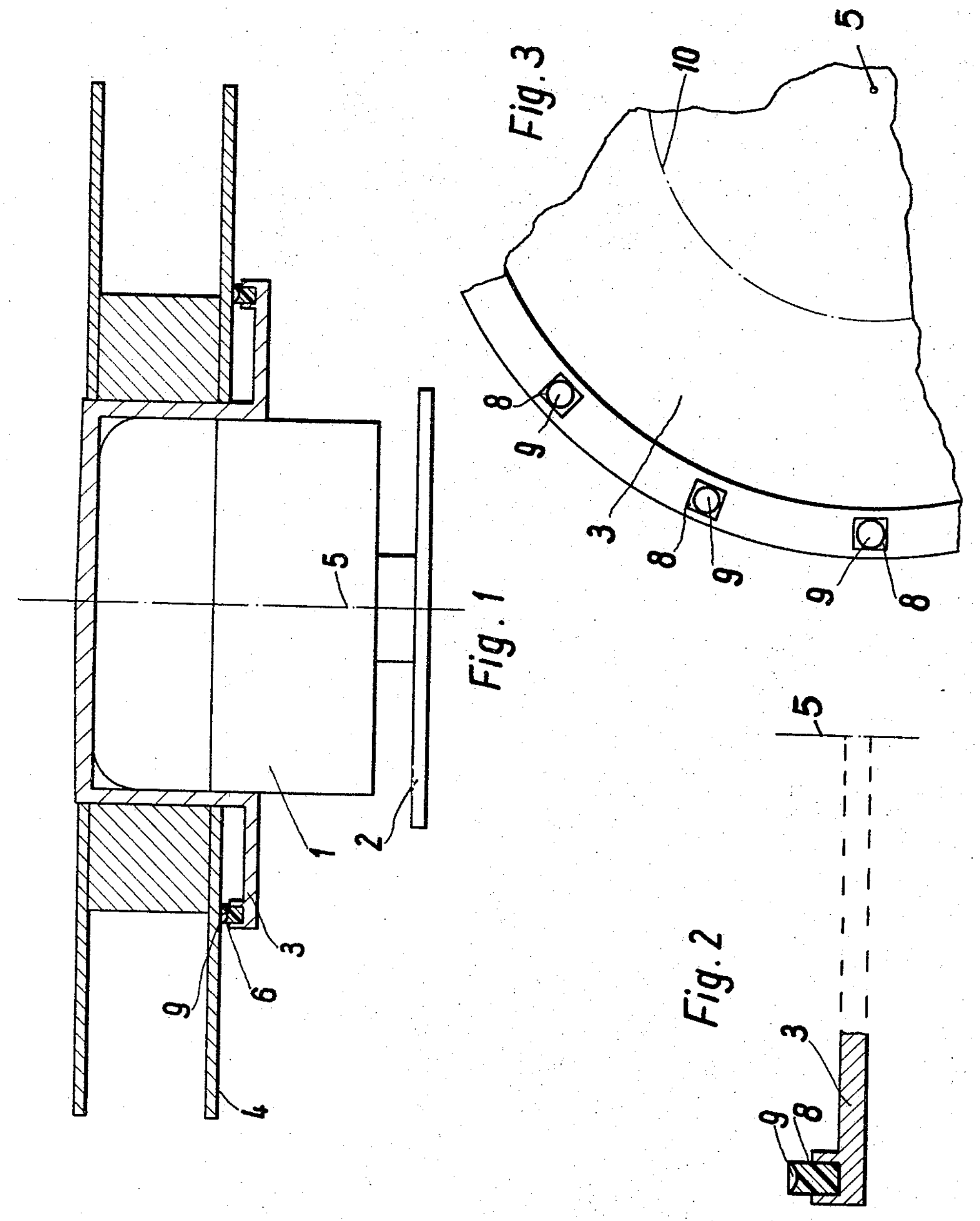
FIG. 1 is an elevation partially in section and shows a turntable for the tape reel with a supporting ring of a material of good frictional properties in accordance with the invention.
FIG. 2 illustrates the use of cams as supporting elements for the tape reel in accordance with the invention.
FIG. 3 is a fragmentary plan view of the tape reel shown in FIG. 2.

In FIG. 1, 1 is the drive spindle of the turntable for the tape reel 4. 2 is the appropriate driving wheel on which the drive motor engages. 3 is the turntable seated on drive spindle 1.

In accordance with the invention there is now provided in the turntable 3 an annular element 6 supporting the tape reel 4 disposed concentrically to the axis of rotation 5 of the turntable, such supporting element consisting of a material of good frictional properties, e.g., rubber or a plastics material. In accordance with the invention the annular supporting element 6 protruding from the turntable 3 is supplied with depressions 9 forming suction cups arranged within the surface contacting the tape reel 4. Tape reel 4 is pressed on to this annular supporting element 6. The material of such element 6 causes good static friction between reel 4 and turntable 3, so that the conventional expanding spindle or sprung catches in the spindle for the tape reel can be omitted.

FIGS. 2 and 3 indicate in cross-section and in a fragmentary plan view another embodiment of the invention in which the annular element in turntable 3 is replaced by single cams 8 which are also disposed concentrically to the axis of rotation 5 and on a ring periphery on turntable 3. These cams 8 are supplied too with said depressions 9 and can also be distributed in several circles on turntable 3, for example on an additional circle indicated by the center line 10.

What is claimed is:

1. In a tape reeling system comprising a turntable for supporting a reel in magnetic sound or video tape recorders, a tape reel, a drive spindle, and means for rotating said drive spindle, said turntable seating on said drive spindle for being rotated being supplied with at least one ring made of material of good frictional properties concentrically arranged around said drive spindle, said ring protruding from said turntable for supporting said tape reel being supplied with depressions forming suction cups arranged within the surface contacting said tape reel.

2. In a tape reeling system comprising a turntable for supporting a reel in magnetic sound or video tape recorders, a tape reel, a drive spindle, and means for rotating said drive spindle, said turntable seating on said drive spindle for being rotated being supplied with a plurality of annularly arranged cams distributed concentrically around said drive spindle and protruding from said turntable for supporting said tape reel, said cams made of material of good frictional properties being supplied with depressions forming suction cups arranged within the surface contacting said tape reel.

3. In a tape reeling system as claimed by claim 2, said supporting cams being arranged concentrically around said drive spindle in such a manner that said cams form a plurality of annular cam series lying concentrically around said drive spindle.

References Cited

UNITED STATES PATENTS

| | | | |
|---|---|---|---|
| 2,702,834 | 2/1955 | Golle et al. ---- | 242—55.12 X |
| 2,928,620 | 3/1960 | Stavrakis et al. ----- | 242—68.3 |

LEONARD D. CHRISTIAN, *Primary Examiner.*

FRANK J. COHEN, *Examiner.*